United States Patent
Frey et al.

(10) Patent No.: US 10,576,586 B2
(45) Date of Patent: Mar. 3, 2020

(54) METHOD FOR PRODUCING A SINTERED PART HAVING A HIGHLY PRECISE MOLDED PART HEIGHT AND PARTS SET OF SINTERED JOINING PARTS

(71) Applicant: GKN Sinter Metals Engineering GmbH, Radevormwald (DE)

(72) Inventors: Sascha Frey, Troisdorf (DE); Alexander Tausend, Remscheid (DE); Kerstin Ziegler, Solingen (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 320 days.

(21) Appl. No.: 15/023,900

(22) PCT Filed: Sep. 17, 2014

(86) PCT No.: PCT/EP2014/002515
§ 371 (c)(1),
(2) Date: Mar. 22, 2016

(87) PCT Pub. No.: WO2015/039747
PCT Pub. Date: Mar. 26, 2015

(65) Prior Publication Data
US 2016/0236301 A1    Aug. 18, 2016

(30) Foreign Application Priority Data
Sep. 23, 2013   (DE) .................. 10 2013 015 676

(51) Int. Cl.
*B22F 7/06*       (2006.01)
*B23K 33/00*    (2006.01)
(Continued)

(52) U.S. Cl.
CPC .............. *B23K 33/00* (2013.01); *B22F 5/106* (2013.01); *B22F 7/062* (2013.01); *B23K 20/02* (2013.01);
(Continued)

(58) Field of Classification Search
CPC ................................................ B22F 2005/005
See application file for complete search history.

(56) References Cited

U.S. PATENT DOCUMENTS

| 4,783,898 A | 11/1988 | Kanamaru et al. |
| 6,101,713 A | 8/2000 | May et al. |

(Continued)

FOREIGN PATENT DOCUMENTS

| GB | 1174624 A | 12/1969 |
| JP | S5993803 A | 5/1984 |

OTHER PUBLICATIONS

PCT International Search Report for corresponding International Application No. PCT/EP2014/002515; dated Mar. 12, 2015.

*Primary Examiner* — Adam Krupicka
(74) *Attorney, Agent, or Firm* — Quarles & Brady LLP

(57) ABSTRACT

The invention relates to a method for producing a sintered part having a highly precise molded part height, the sintered part being produced from a first sintered joining part that has a first joining surface and a second sintered joining part that has at least a second joining surface. The method comprises at least the following steps: joining the first sintered joining part and the second sintered joining part, the first joining surface being oriented such that it faces the second joining surface; pressing the first sintered joining part and the second sintered joining part against each other under axial compression pressure exerted by a pressing tool, the highly precise molded part height being brought about by pressing the parts against each other; removing the sintered part from the pressing tool as a sintered part having a highly precise (Continued)

molded part height. The invention also relates to a parts set of sintered joining parts.

16 Claims, 10 Drawing Sheets

(51) Int. Cl.
  *B22F 5/10* (2006.01)
  *B23K 20/02* (2006.01)
  *B32B 3/30* (2006.01)
  *B32B 5/16* (2006.01)
  *B32B 7/04* (2019.01)
  *B32B 15/01* (2006.01)
  *B23K 101/00* (2006.01)
  *B22F 5/00* (2006.01)

(52) U.S. Cl.
  CPC .............. *B32B 3/30* (2013.01); *B32B 5/16* (2013.01); *B32B 7/04* (2013.01); *B32B 15/01* (2013.01); *B22F 2005/005* (2013.01); *B23K 2101/005* (2018.08); *B32B 2264/105* (2013.01)

(56) References Cited

U.S. PATENT DOCUMENTS

| | | | |
|---|---|---|---|
| 2004/0013897 A1* | 1/2004 | Yano | B23K 1/0008 428/548 |
| 2011/0111247 A1* | 5/2011 | Lemke | B23K 1/0008 428/600 |
| 2011/0126785 A1* | 6/2011 | Terfloth | F01L 1/022 123/90.15 |
| 2014/0238325 A1 | 8/2014 | Frey | |

* cited by examiner

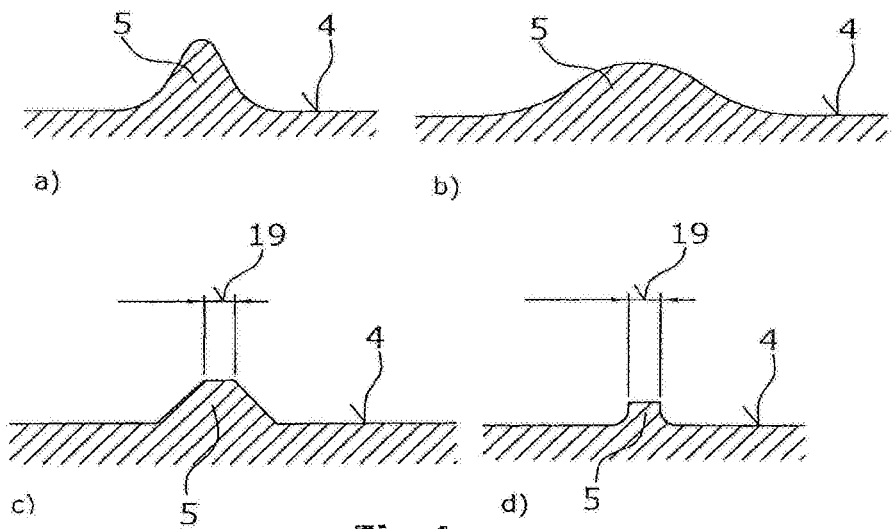
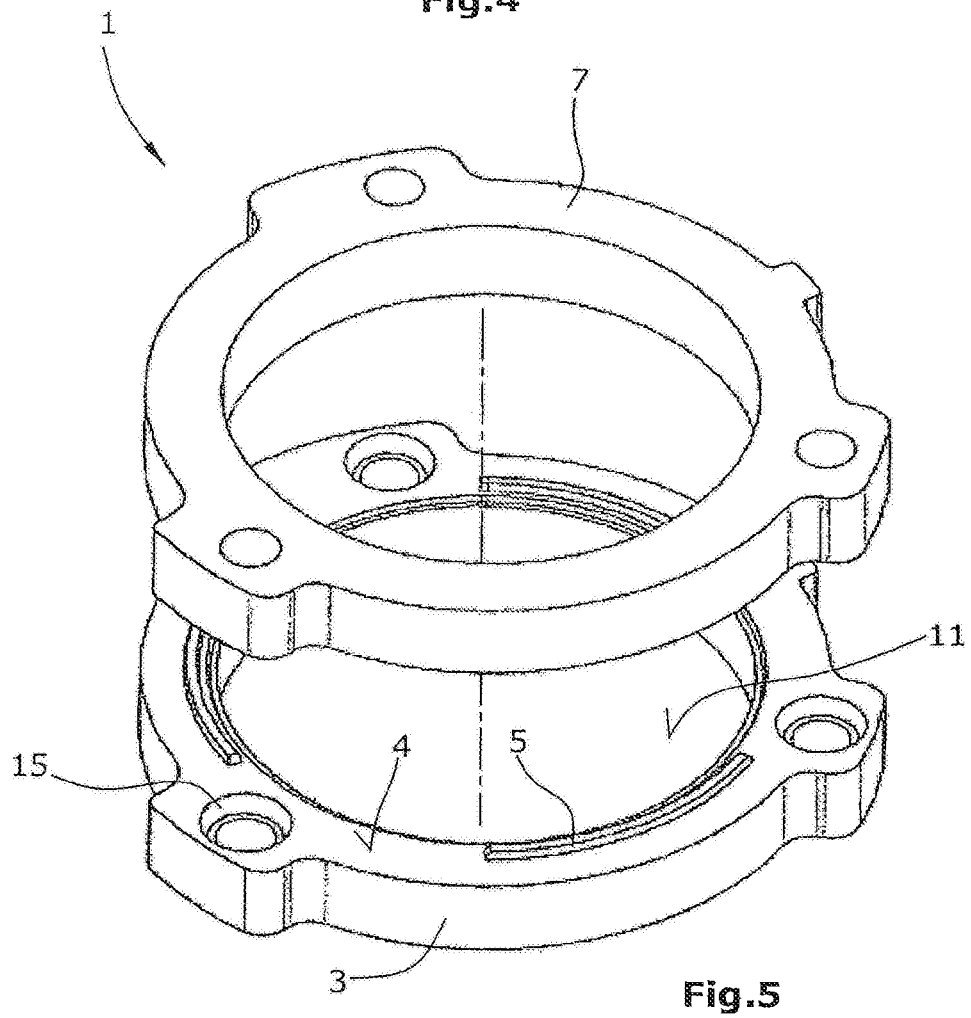

METHOD FOR PRODUCING A SINTERED PART HAVING A HIGHLY PRECISE MOLDED PART HEIGHT AND PARTS SET OF SINTERED JOINING PARTS

This application represents the national stage entry of PCT International Application No. PCT/EP2014/002515 filed Sep. 17, 2014, which claims priority to German Patent Application No. 10 2013 015 676.9 filed Sep. 23, 2013, the disclosures of which are incorporated herein by reference in their entirety and for all purposes.

The present invention relates to a method for producing a sintered part having a precise-height molded part height. Furthermore, the present invention relates to a parts set of sintered joining parts for joining to form a sintered part having a precise-height molded part height.

A method for producing a sintered part having a precise-height molded part height is known for example from US 2010/0178190 A1. It is apparent from US 2010/0178190 A1 that a possibility for producing a sintered part with a precise-height molded part height consists in providing line elevations on one of the outer end sides or on both outer end sides of the sintered part. These line elevations can then be embossed in an axial direction with comparatively little applied pressure until the required precise-height molded part height has been achieved. However, in such a procedure, it is necessary to accept the line elevations present on one or both end sides of the sintered part.

This invention is based on the object of providing a sintered part having a precise-height molded part height, said sintered part having improved properties.

The object is achieved by a method for producing a sintered part having a precise-height molded part height having the features of claim 1 and by a parts set having the features of claim 9.

Further advantageous configurations and developments can be gathered from the following description. One or more features from the claims, the description and the figures can be combined with one or more features therefrom to form further configurations of the invention. In particular, one or more features from the independent claims can also be replaced by one or more other features from the description and/or the figures. The proposed claims are to be understood only as an outline for formulating the subject matter, but without limiting the latter.

A method for producing a sintered part having a precise-height molded part height is proposed. The sintered part is produced here from at least one first sintered joining part having at least one first joining face and a second sintered joining part having at least one second joining face. The method comprises at least the following steps of:

joining the first sintered joining part to the second sintered joining part, wherein the first joining face is oriented toward the second joining face;

pressing the first sintered joining part and the second sintered joining part together under an axial pressing force effected by means of a press tool. Here, the precise-height molded part height is brought about by the pressing-together operation;

removing the sintered part from the press tool as a sintered part with a precise-height molded part height.

The concept of the joining face in this case denotes a side on which the rotation axis is oriented perpendicularly or at least substantially perpendicularly in the case of a sintered part provided for a rotary movement. The concept of the joining face in this case includes elevations or depressions. It is thus not necessary for a joining face to be configured as a completely planar face.

The concept of the first sintered joining part and the second sintered joining part should be understood as meaning that it is in each case a sintered component which is intended for joining. Thus, the first sintered joining part is a sintered component which is intended for joining, for example to the second sintered joining part.

The concept of the precise-height molded part height should be understood as meaning that the sintered part has a molded part height which provides for the sintered part to be used directly for its intended purpose. In particular, mechanical finishing, for example by machining, in particular for example grinding or turning, is intended no longer to be necessary.

The pressing together of the first sintered joining part and the second sintered joining part by means of a press tool should be understood as meaning that an axial pressing force is effected on at least one of the sintered joining parts. The press tool in this case does not necessarily have to be the same tool as is intended for joining. The exertion of axial pressing force should not be understood as meaning that pressure is exerted directly on one or more of the first and second sintered joining parts, but rather provision can likewise be made for more than two sintered joining parts for example to be joined and for only one of the first sintered joining part and the second sintered joining part or even neither of the first sintered joining part and the second sintered joining part to come into direct contact with the press tool. The concept of pressing together comprises, in a joined state of the sintered part, in particular embossing of the sintered part, i.e. exertion of pressure in an axial direction in order to bring about the intended height.

Provision can be made for example for joining and embossing to take place in one and the same process step.

Provision can likewise be made for example for joining to take place in a first step and then embossing to take place in a further step such that joining and embossing are carried out as sequential process steps.

Provision can likewise be made for example for joining to transition continuously into embossing in that both process steps are carried out in one and the same tool.

In one configuration of the invention, provision can be made in particular for the molded part height to have a tolerance of less than +/−0.05 mm, i.e. for the spacing of the end sides of the sintered part to be less than 0.05 mm more or less than the intended value.

In a preferred configuration of the invention, provision is made for the molded part height to have a tolerance of less than +/−0.025 mm, i.e. for the spacing of the end sides of the sintered part to be less than 0.025 mm more or less than the intended value.

In a particularly preferred configuration of the invention, provision is made for the molded part height to have a tolerance of less than +/−0.15 mm, i.e. for the spacing of the end sides of the sintered part to be less than 0.015 mm more or less than the intended value.

In one configuration of the method, provision can be made for the first sintered joining part to have at least one first deformation element arranged on the first joining face and/or for the second sintered joining part to have at least one second deformation element arranged on the second joining face. Provision is made for example for deformation of at least one of the deformation elements to be brought about by means of the pressing-together operation.

The concept of the deformation element can denote for example an elevation which is present integrally in the first sintered joining part as first deformation element and/or in the second sintered joining part as second deformation element.

A further configuration of the method can provide for example for the first deformation element arranged on the first joining face to be introduced into a first receiving hollow arranged on the second joining face. Provision can likewise be made for at least the second deformation element arranged on the second joining face to be introduced into a second receiving hollow arranged on the first joining face. This has the effect of positioning the deformation elements in a direction oriented perpendicularly to the axial direction.

The possibility is likewise included that a first deformation element arranged on the first joining face is pressed against a smooth region of the second joining face during joining, i.e. that a first receiving hollow corresponding to the first deformation element is not provided. The possibility is likewise included that a second deformation element arranged on the second joining face is pressed against a smooth region of the first joining face during joining, i.e. that a second receiving hollow corresponding to the second deformation element is not provided.

Thus, during the pressing-together operation and in particular also during embossing, at least one deformation element is present in a region which is located inside the component then present as joined sintered part. Embossing thus takes place, allowing greater precision in the setting of the finally provided molded part height with less pressure application, but without any structures present on an outer face of the sintered part being necessary as a result. In particular, this gives rise to the advantage that embossing using deformation elements that support the embossing is allowed, but at the same time it is also possible for there to be planar outer end sides of the joined sintered part, if these are desired.

Provision is preferably made for at least one of the receiving hollows, preferably all of the receiving hollows, to at least regionally have a smaller depth than the respectively corresponding deformation element height. This has the effect that in any case deformation of the deformation element is brought about. It is an advantage of the presence of a deformation element that both precise setting of the molded part height of the sintered part is effected and a reduction in the contact face between sintered joining parts to be joined results on account of a much smaller area of the deformation elements compared with the overall area of the first joining face and/or the second joining face. This has the effect that, during the joining and/or calibration, even at low axial tool forces, the yield stress in the contact zone is exceeded and plastic deformation of the deformation elements occurs.

The receiving hollows that are present have the effect that even at a comparatively low applied axial force, a comparatively large change in the molded part height is effected, and at the same time material that is deformed during the deformation can pass into the free spaces adjoining the structure, in particular the first receiving hollow and/or the second receiving hollow and any other receiving hollows that may be present.

In a further configuration of the method, provision can be made for example for the first deformation element and/or the second deformation element to at least sectionally border a cavity formed by the first sintered joining part and the second sintered joining part during the pressing of the first sintered joining part against the second sintered joining part. Provision can likewise be made here for at least one deformation element to be compressed by the deformation of the first deformation element and/or of the second deformation element. Provision can likewise be made for the cavity to be sealed off with respect to a fluid located in the cavity, when the sintered part is in use, by the deformation of the deformation elements.

On account of the described advantage of the possibility of sealing off cavities, it is thus appropriate to provide one or more cavities in the first joining face and/or in the second joining face, said cavities being configured for example as channels for guiding a fluid. Provision can be made for example for the sintered part to be a rotor of a camshaft adjuster and for one or more cavities to be provided as channels for guiding a pressure fluid, wherein the pressure fluid brings about a rotary movement of the rotor, said rotary movement resulting in the desired adjustment of the camshaft.

Provision can likewise be made for cavities which have the objective of reducing the weight of the sintered part to be formed.

A further configuration of the method, in which at least a first joining element arranged on the first joining face is introduced into a first joining cutout formed in the second joining face and/or a second joining element arranged on the second joining face is introduced into a second joining cutout formed in the first joining face, can be provided. Providing for a joining element to be paired with a joining cutout results in the advantage that at least the first sintered joining part and the second sintered joining part are positioned, in particular in the radial direction. The joining element can in this case be in particular for example an elevation which is present integrally with the sintered joining part. For example, it can be in particular a cylindrical, particularly advantageously a circular cylindrical elevation, the longitudinal axis of which is oriented parallel to a provided rotation axis of the sintered part, if such a rotation axis is provided.

In a further configuration of the method, provision can be made for example for the first deformation element to be arranged on the first joining element or for the first joining element to act as the first deformation element and/or for the second deformation element to be arranged on the second joining element or for the second joining element to act as the second deformation element.

In one configuration, in which for example the first joining element acts as the first deformation element, provision can be made for example for an axial extent of the first joining element to be greater than an axial extent of the first joining cutout. This would have the effect that a region of the first joining element that is farthest away from the joining face is compressed in an end stage of the introduction of the first joining element. Provision can likewise be made for the second joining element to act as the second deformation element. This can be provided for example in that an axial extent of the second joining element is greater than an axial extent of the second joining cutout. This has the result for example that a region of the joining elements that is farthest away from the joining face is compressed in an end stage of the introduction of the second joining element into the second joining cutout.

In a further configuration of the method, provision can be made for example for at least the first joining element to be configured in a narrowing shape with increasing distance from the first joining face. Provision can likewise be made for example for at least the first joining cutout to be configured in a narrowing manner with increasing depth into the second sintered joining part. This has the advantageous effect that the compressive deformation of the first joining element is brought about by the pressing-together operation. The advantage achieved thereby comprises the fact that the individual parts can be plugged into one another in a similar manner to a conical interference fit, such that easy joining, resulting in an efficient pressed connection, is possible.

A particularly advantageous configuration of the method arises in cases in which in each case a joining element and a joining cutout are arranged in an alternating manner on the first joining face and a joining cutout and a joining element are formed on the second joining face in an alternating manner complementary thereto.

As a result of the provided structures, a press fit and possibly cold welding of the contacting surfaces arise on account of the deformation during joining, and this results in a form-fitting and frictional connection of the parts to be joined. In a case in which the joining structure is in the form of alternating conicities, which allow the individual parts to be plugged into one another in a similar manner to a conical interference fit, an example is provided in which a joining element is simultaneously present as a deformation element.

In one configuration of the method, provision can be made for example for at least one insert part to be inserted in a first cutout in the first sintered joining part and/or in a second cutout in the second sintered joining part.

In a possible configuration, provision can be made for example for the insert part to be compressed in an axial direction and as a result to contribute to bringing about the precise-height molded part height.

Provision is preferably made of a configuration in which plastic compression of the insert part in the axial direction takes place.

The insert part can be for example a sintered part which exhibits for example a sintered steel and/or a sintered metal. However, insert parts produced using other production methods than sintering can also be provided. It is likewise also possible to provide for example plastics parts as insert part in addition to steel or some other metal material.

The concept of the cutout can in this case denote both depressions and continuous cutouts in the sintered joining parts.

In a further configuration of the method, the production of the sintered part furthermore comprises bringing about high radial precision.

Preferably, the bringing about of the high radial precision involves deformation of at least one radial deformation element.

In one configuration of the method, the radial deformation element is positioned in a manner adjoining a joining contact zone at least from time to time during the bringing about of the high radial precision, wherein the deformation of the radial deformation element is effected at least by means of a calibration tool and takes place at least substantially as plastic deformation of the radial deformation element.

The concept of the high radial precision means in particular precision in a radial direction of the sintered part with a tolerance of less than +/−0.050 mm in the radial direction, such that no extent deviates by more or less than 0.050 mm from its intended value of dimensional accuracy.

In a preferred configuration of the invention, provision is made for the high radial precision to have a tolerance of less than +/−0.025 mm, in other words for no deviation from an extent in the radial direction of more than 0.025 mm greater or less than the intended value of dimensional accuracy to occur. In a particularly preferred configuration of the invention, provision is made for the radial precision to have a tolerance of less than +/−0.015 mm, i.e. no extent deviates by more or less than 0.015 mm from its intended value of dimensional accuracy.

The concept of the calibration tool can denote a separate tool by means of which calibration of a sintered part that has already been previously joined, in particular in another tool, is calibrated. However, provision can likewise also be provided for example for the concept of the calibration tool to denote a region of a tool in which, in addition to calibration, joining of the sintered part, at least the first sintered part and the second sintered part, has also already taken place. Thus, provision can be made for example for use to be made of a stage tool in which first of all joining and in a further step calibration take place sequentially. Provision can likewise be made for example for joining and calibration to take place at least from time to time at the same time, i.e. for example for joining to transition into calibration without a discrete transition. Thus, provision can be made for example for the step of bringing about the high radial precision in a region of the calibration tool to have already started at a time in which calibration is already taking place.

Joining, calibration and embossing can be performed sequentially in any desired order. However, it is also possible for two or more of the process steps of joining, calibration and embossing to take place at least in part simultaneously.

A further concept of the invention, which is also intended to be able to be pursued independently of the concepts of the invention set out above, relates to a parts set of sintered joining parts for joining to form a sintered part having a precise-height molded part height. In this case, the parts set has at least one first sintered joining part with a first joining face and a second sintered joining part with a second joining face.

In particular, the parts set has the advantage that joining of the parts set to form a sintered part having a precise-height molded part height is allowed, and the precise-height molded part height has in particular the effect that finishing by machining, for example by milling, grinding and/or turning, is not required in order to bring about the desired dimensional accuracy.

In one configuration of the parts set, provision can be made for the first sintered joining part to have at least one first deformation element arranged on the first joining face and/or for the second sintered joining part to have at least one second deformation element arranged on the second joining face.

The advantage of a deformation element is that the contact face between the sintered joining parts to be joined is reduced, such that during joining and/or calibration, even at low axial tool forces, the yield stress in the contact zone is exceeded. A resulting deformation of the deformation element or deformation elements, for example and in particular in the form of plastic deformation of the deformation element, can in this case be already brought about by low tool forces. This results for example in the advantage that a comparatively large change in the molded part height is effected by a comparatively low applied axial force, thereby considerably simplifying the bringing about of a precise-height molded part height and/or the bringing about of precise flatness in terms of height.

In a specific configuration of the parts set, provision can be made for example for the second sintered joining part to have a first receiving hollow, arranged in the second joining face, for the first deformation element. The presence of a receiving hollow which corresponds in its radial position to the position of the deformation element has the advantage that, following first introduction of the deformation element into the receiving hollow, a force application that takes place during joining and/or during embossing does not result in an in particular radial displacement of the relative positioning of the first sintered joining part with respect to the second sintered joining part.

In a preferred configuration of the parts set, at least one receiving hollow at least regionally has a smaller depth than the respectively corresponding deformation element height. This has the effect that, with simultaneous prevention of a loss of radial positioning, a deformation of the deformation element is nevertheless brought about with applied axial pressure on account of the lower height of the receiving hollow compared with the corresponding deformation element.

In a further configuration of the parts set, provision can be made for example for at least one of the sintered joining parts to have a cavity for passing through a fluid. Furthermore, in one configuration, provision can be made for at least one of the deformation elements to at least sectionally border the cavity in order to seal off a fluid located in the cavity after the joining of the sintered part. The fluid is sealed off in this case in particular in that, after the subsequent deformation of the deformation element at least sectionally bordering the cavity, the then compressed deformation element fills free spaces that may be present in the counterpart body, in particular by plastic flow of the material of the deformation element, such that it is possible to seal off the fluid. A further advantage is the strain hardening that occurs as a result of the compression, said strain hardening resulting in greater resistance to forces effected by pressurized fluids.

The concept of the cavity can denote for example a cavity which is provided in only one of the sintered joining parts and which thus represents a half-space in the non-joined state of the first sintered joining part and/or the second sintered joining part. However, after the first sintered joining part has been joined to the second sintered joining part, this cavity then arises as a cavity which can be provided for example for passing through a fluid. A further possible advantage of introduced cavities can consist for example in a saving of material and in particular in a consequent reduction in the weight of the sintered part.

However, provision can likewise also be made for both the first sintered joining part and the second sintered joining part to have a cavity, wherein the cavity in the first sintered joining part and the cavity in the second sintered joining part form a common cavity after the first sintered joining part has been joined to the second sintered joining part.

The concept of the fluid means in particular gases and/or liquids, but also for example transitional forms, for example substances suspended in gases and/or liquids, i.e. suspensions.

An application example for the use of deformation elements which are used in a compressed configuration for sealing off a fluid located in the cavity after deformation can be for example sealing structures, which are used in the case of media through-channels through which flow is able to pass in opposite directions, and/or in the case of annular sintered components.

At least sectional bordering of the cavity involves in this case bordering such that the deformation element forms, as a deformation element bordering the cavity, a part of an inner face of the cavity, for example as a result also coming at least regionally into contact with a fluid passed through the cavity. However, it likewise also involves understanding that the at least sectionally bordering deformation element is spaced apart from the cavity at least regionally, but for example also completely. For example, it can in particular involve there being a spacing from the cavity of less than 5 mm. It can likewise involve for example there being a spacing of less than 2 mm from the cavity. It can likewise involve there being a spacing of less than 1 mm from the cavity.

A further configuration of a parts set can be configured for example in that the first sintered joining part has at least one first joining element arranged on the first joining face and the second sintered joining part has a first joining cutout formed in the second joining face. Joining the first sintered joining part to the second sintered joining part is allowed here in that the first joining element is introduced into the first joining cutout. In this case, provision can be made for example for the first joining element to be in a clearance fit upon introduction into the first joining cutout. Provision can likewise be made for the first joining element to be introduced into the first joining cutout with a press fit. Introducing the first joining element into the first joining cutout with a press fit can have the effect for example of effecting a friction fit and/or an integral bond between the first sintered joining part and the second sintered joining part.

Provision can likewise be made for the second sintered joining part to have at least one second joining element arranged on the second joining face and for the first sintered joining part to have a second joining cutout formed in the first joining face.

In particular, provision can be made for example for a number of joining elements and a number of joining cutouts to be provided in the first sintered joining part and at the same time for a number of joining cutouts and joining elements to be provided in the second sintered joining part, and for each joining element of the first sintered joining part to have a corresponding joining cutout in the second sintered joining part and for each joining element of the second sintered joining part to be assigned to a corresponding joining cutout in the first sintered joining part. In this case, provision can be made for example for joining element and joining cutout to be arranged in a respectively alternating manner on the first sintered joining part and/or on the second sintered joining part.

In one configuration of the parts set, provision can be made for example for the deformation element to be arranged on the first joining element and/or for the second deformation element to be arranged on the second joining element. This results for example in the advantage that space in which the deformation element is allowed to flow when subjected to axial pressure is formed by the joining cutout.

Provision can likewise be made in one configuration for example for the first joining element to be configured as the first deformation element and/or for the second joining element to be configured as the second deformation element. A configuration of the first joining element as the first deformation element and/or of the second joining element as the second deformation element can arise for example in that a height of the first joining element is greater than a depth of the first joining cutout. Therefore, when the first joining element is introduced into the first joining cutout, an upper region of the first joining element can be compressed when the first sintered joining part is pressed axially against the second sintered joining part and as a result the upper region can be configured as the first deformation element. This has the advantage for example that there can be a structurally very simple solution of a combination of a joining element with a deformation element. For further joining elements, for example the second joining element, the same applies in an analogous manner.

Provision can likewise be made for example for the first deformation element to be arranged on a bottom of the first joining cutout and/or for the second deformation element to be arranged on a bottom of the second joining element.

In a further configuration of a parts set, provision can be made for example for one deformation element, several deformation elements or preferably all of the deformation elements to each be configured as an elevation with one of the geometrical shapes of
spherical segment,
truncated spherical segment,
truncated cone,
cuboid,
truncated trapezium or
truncated pyramid.

In a preferred configuration of the parts set, all of the deformation elements are the same shape. In particular, a spherical segment and truncated spherical segment should be considered to be a particularly preferred configuration of the deformation elements, since with such a shape, particularly efficient flow occurs as a result of the spherical rotational symmetry of the shape of the deformation elements.

In a further configuration of the parts set, provision can be made for example for at least one of the deformation elements to have a minimum extent of an upper contact face of 0.2 mm in at least one dimension of the contact face. Particularly preferably, at least one deformation element has a minimum extent of an upper contact face of 0.2 mm in at least each direction lying in the upper contact face. A minimum extent of 0.2 mm results in the advantage that the contact face is sufficiently large to effect a first abutment such that defined flow can take place under axial pressure on the deformation element.

A further configuration of the parts set can be configured such that at least one of the deformation elements has an extension of a base with a value of between 0.4 mm and 2.0 mm in at least one dimension of the base.

A further configuration of the parts set can be provided in that a height of the at least one deformation element has a value of between 0.1 mm and 2.0 mm between the base and the contact face. A value of between 0.1 mm and 2.0 mm has proven to be particularly advantageous in that on the one hand there is a sufficiently large spacing between the contact face and the base for there still to be a possibility of influencing the height in a relevant magnitude and on the other hand there is a sufficient material supply to ensure deformation in order to equalize the height difference to be compensated.

In a specific configuration of the parts set, provision can be made for example for the parts set to have at least one insert part for inserting into a first cutout in the first sintered joining part and/or into a second cutout in the second sintered joining part.

Preferably, provision can be made here for the insert part to have an axial extent which is at least partially greater than an overall axial extent of the first cutout and the second cutout.

By way of a provided insert part having an axial extent which is at least partially greater than an overall axial extent of the first cutout and the second cutout, it is possible in particular to bring about the advantageous effect that, as a result of a deformation, in particular a substantially plastic deformation, of the insert part, the precise-height molded part height can be brought about in a particularly advantageous manner.

The insert part can be for example a part of the sintered part which is responsible for a functionality or a part of a functionality of the sintered part; however, provision can likewise also be made for the insert part to be a component specifically provided for the described improvement in joining.

A further configuration of the parts set is provided in such a configuration that the precise-height joined sintered part is a rotor for a camshaft adjuster, a pump ring, a stator or a shock absorber piston.

In particular, provision can be made to use one of the described parts sets for joining to form a sintered part that is removable from the press as a precise-height sintered part. Preferably, one of the methods that was described above is used for this purpose.

Further advantageous configurations and developments can be gathered from the following figures. The details and features that can be gathered from the figures are not limited thereto, however. Rather, one or more features can be combined with one or more features from the above description to form new embodiments. In particular, the following statements do not serve as a limitation of the particular scope of protection, but explain individual features and the possible interaction thereof with one another. In the figures:

FIG. 4 shows various configurations of deformation elements in section;

FIG. 5 shows a further example of a sintered part using the example of a multipart pump ring prior to joining;

Figure 1:
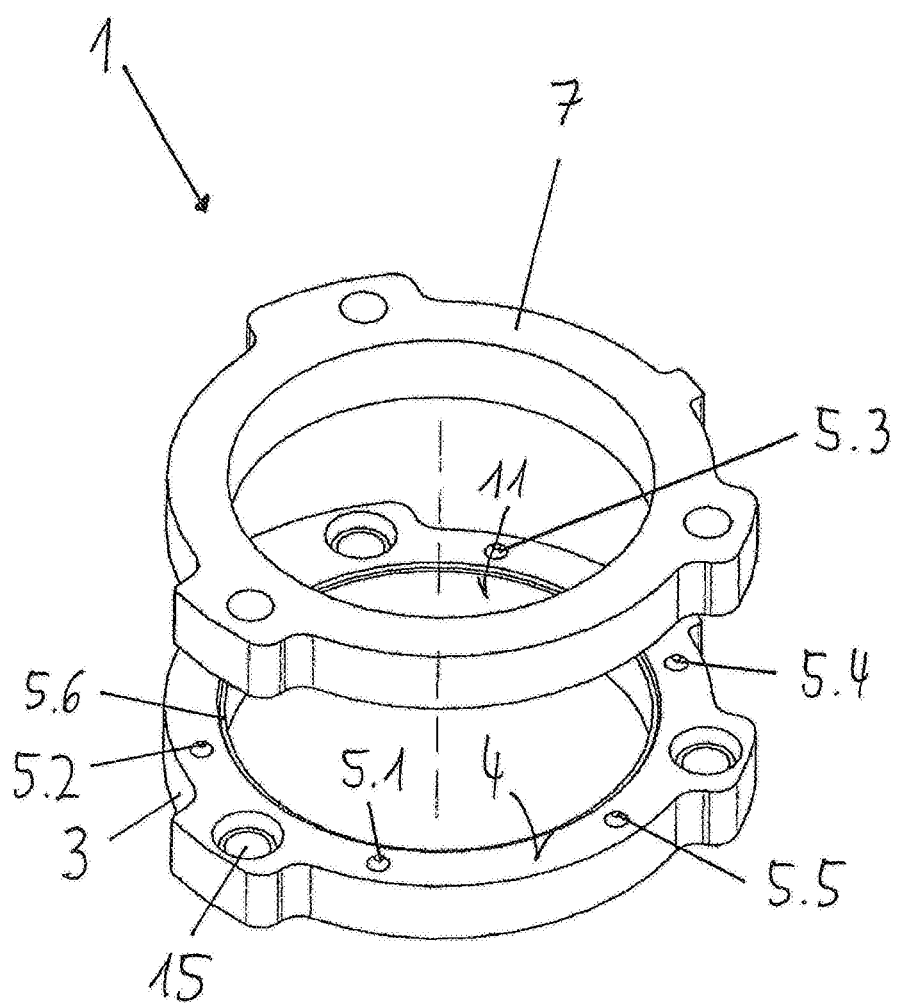
FIG. 1 shows an exemplary configuration of a parts set using the example of a multipart pump ring prior to joining.

FIG. 1 shows a configuration of a parts set 1. In the illustrated exemplary configuration, the parts set 1 is a first sintered joining part 3 and a second sintered joining part 7, wherein the first sintered joining part 3 and the second sintered joining part 7 are intended for joining to form a sintered part configured as a pump ring. In the exploded illustration in FIG. 1, the first joining face 4 is oriented so as to face toward the second joining face 8 (not illustrated).

Furthermore, the illustration in FIG. 1 shows a first deformation element 5.1, a deformation element 5.2, a deformation element 5.3, a deformation element 5.4 and a deformation element 5.5, wherein each of the deformation elements 5.1, 5.2, 5.3, 5.4 and 5.5 is configured as a truncated cone. All of the deformation elements 5.1, 5.2, 5.3, 5.4 and 5.5 are positioned equidistantly from one another with respect to the center of the illustrated cavity, configured as a circular opening, wherein a further frustoconical deformation element is concealed by the second sintered joining part 7 in the illustration shown and thus cannot be seen in the illustration. Furthermore, FIG. 1 shows a further deformation element 5.6, which is configured as a line-form elevation, wherein the line-form elevation has a trapezoidal cross section in the illustration shown. The line-form elevation borders the cavity 11 formed by the first sintered joining part 3 and the second sintered joining part 7 in a fully encircling manner, such that the cavity 11 is sealed with respect to a fluid located in the cavity after deformation of the deformation element 5.6 and the compression thereof.

In order to allow joining with exact radial positioning, the illustration furthermore also shows a joining element 15 and also two further joining elements.

FIG. 2a shows an illustration of the first sintered joining part 3 shown in FIG. 1 and the second sintered joining part 7 of the parts set 1 from FIG. 1. In particular, the cross section in FIG. 2a also reveals the trapezoidal cutout, which can be perceived as a trapezium in cross section, in the deformation elements 5.2, 5.5 and 5.3. Furthermore, FIG. 2a shows the deformation element 5.6, which fully borders the cavity 11. FIG. 2a likewise shows how a joining element 14 corresponding to the joining cutout 15 is arranged.

Figure 2:
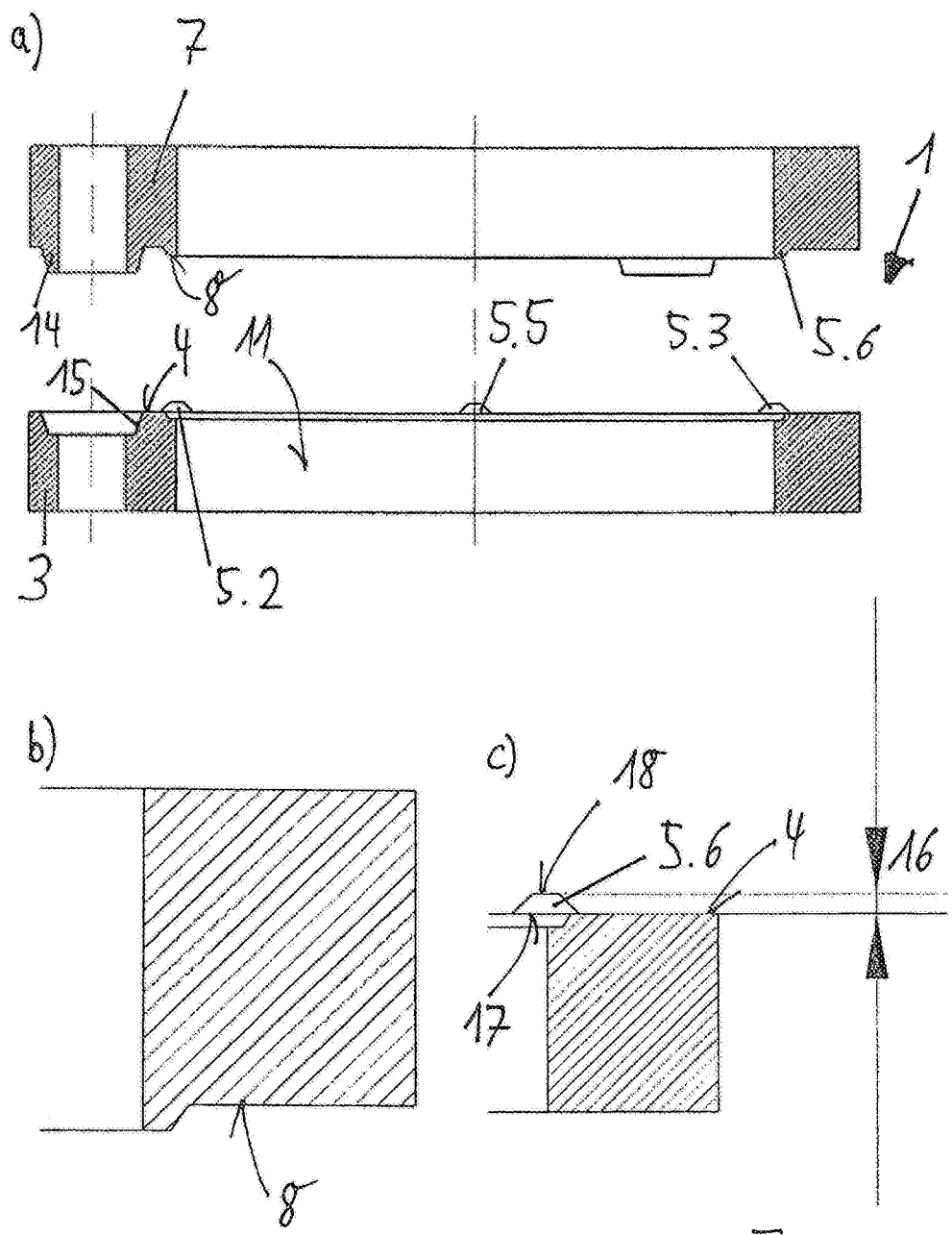
FIG. 2 shows the parts set from FIG. 1 in detail and in section.
Figure 3:
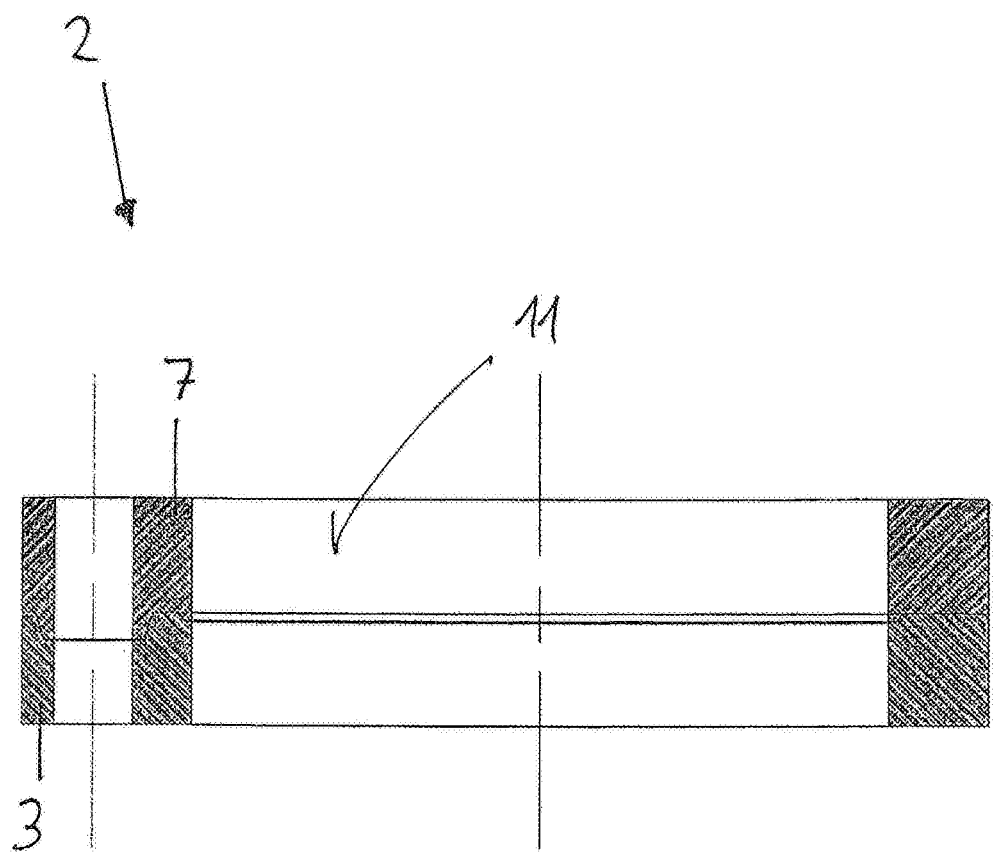
FIG. 3 shows a sintered part made of a first sintered joining part and a second sintered joining part in an exemplary configuration using the example of a multipart pump ring in section.

FIGS. 2b and 2c show details from FIG. 2a in an enlarged illustration. In particular, FIG. 2 reveals how, on the basis of the joining face 4, the height of the deformation element 5.6 should be understood as a spacing 16, specifically as a distance between a base 17 and a contact face 18. FIG. 3 shows the component shown in FIG. 1 in a joined configuration.

FIGS. 4a to 4d show four different configurations of a deformation element 5, wherein the deformation elements in FIGS. 4a to 4d are illustrated in the form of a first deformation element 5 and are formed as an elevation rising out of a first joining face 4. The configurations shown in FIGS. 4a to 4d reveal exemplary configurations of deformation elements, for example the rounded cone shown in FIG. 4a, the spherical segment shown in FIG. 4b, which has a rounded transition into the joining face 4, the truncated cone shown in FIG. 4c, and the cuboid shown in FIG. 4d, which likewise has a rounded transition into the joining face 4. FIGS. 4c and 4d show, by way of example, the configuration of the contact face with its extent 19, which has a minimum extent of 0.2 mm, this being understood as meaning that the extent 19 is intended to be 0.2 mm or more.

FIG. 5 shows a further configuration of a parts set for producing a sintered part 2, wherein the parts set 1 is formed from a first sintered joining part 3 and a second sintered joining part 3. The parts set 1 is configured here as a parts set 1 for producing a sintered part 2 in the form of a pump ring. As a significant difference between the pump ring in FIG. 5 and the difference in FIG. 1, the first deformation element 5 in FIG. 5 is not configured as a deformation element that fully encircles the cavity 11, but rather as a deformation element that encircles the cavity 11 only partially.

Figure 6:
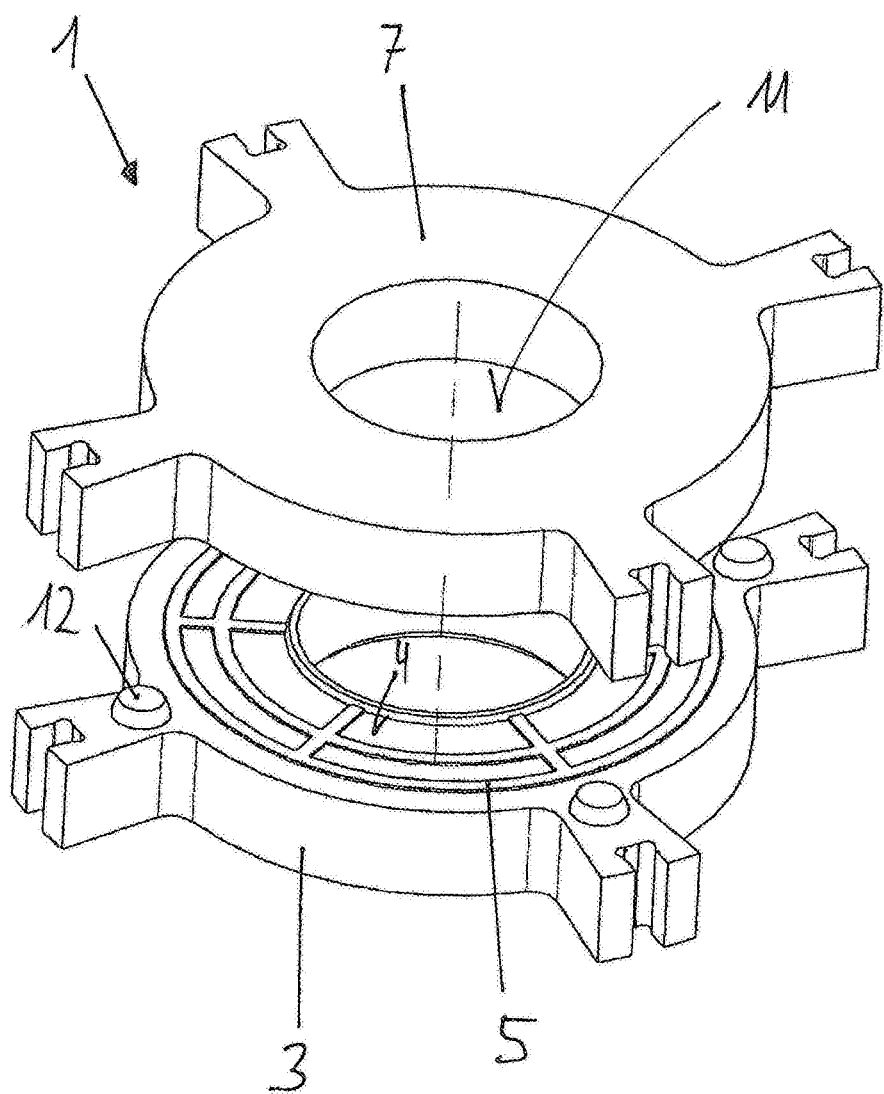
FIG. 6 shows a further example of a sintered part using the example of a multipart rotor prior to joining.

FIG. 6 shows a configuration of a parts set using the example of a multipart rotor prior to joining. In particular, in contrast to the configuration of a parts set shown in FIG. 1, the first deformation element is formed as a lattice structure made up of concentric and radial line elevations with a rectangular cross section. Furthermore, FIG. 6 shows a joining element 12.

Figure 7:
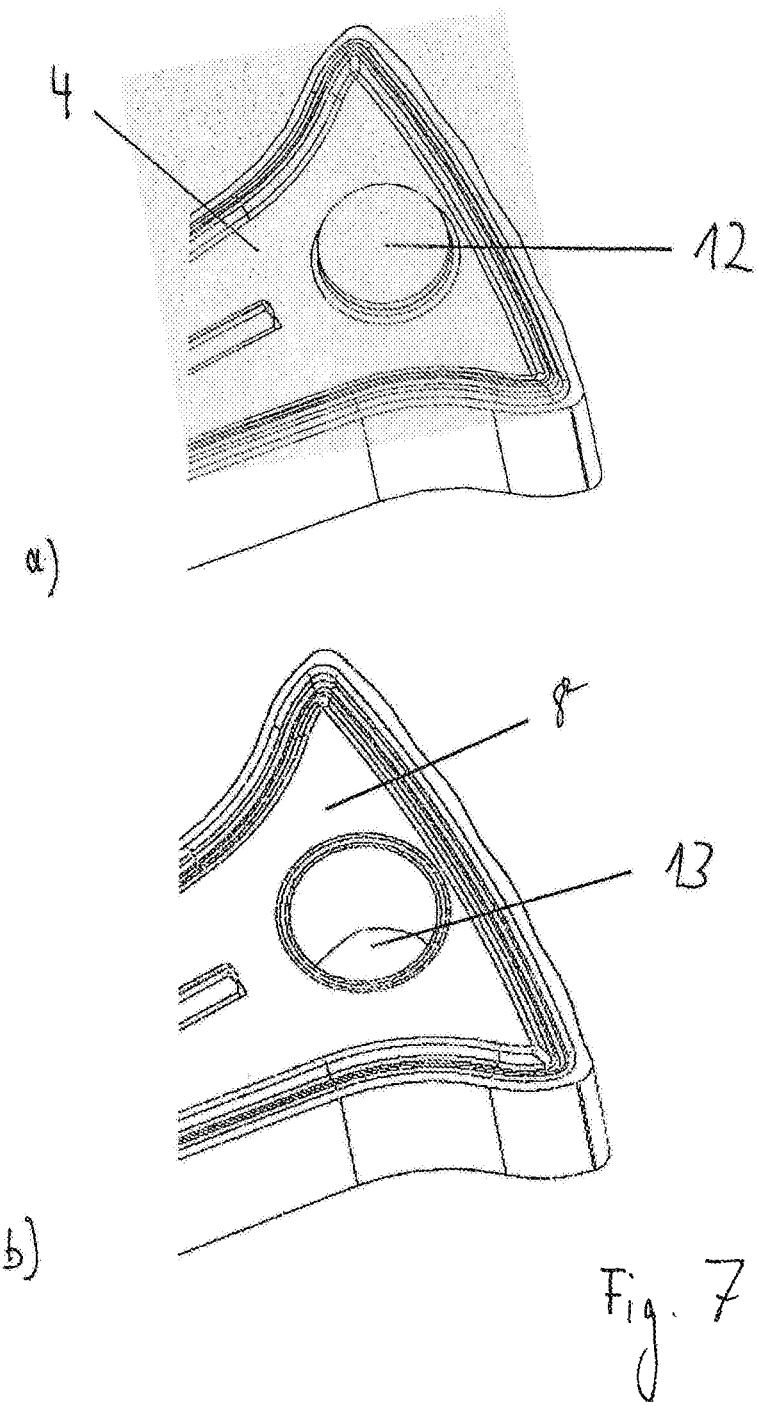
FIG. 7 shows a detail of an illustration of a first joining face of a first sintered joining part and a detail of an illustration of a second joining face of a second sintered joining part.

FIG. 7a shows a detail of a first joining face 4 of a first sintered joining part. The first joining face 4 has in this case an exemplary configuration of a first joining element 12 as a truncated cone. FIG. 7b shows a detail of a second joining face 8 of a second sintered joining part. The second joining face 8 has in this case a first joining cutout 13 configured as a circular cylindrical opening. In order to join the first sintered joining part to the second sintered joining part, the first joining element 12 is introduced into the first joining cutout 13, wherein, on account of the regionally conical configuration of the first joining element 12, the latter contributes toward an in particular force-fitting connection of the first sintered joining part to the second sintered joining part while it is being introduced into the first joining cutout 13.

Figure 8:
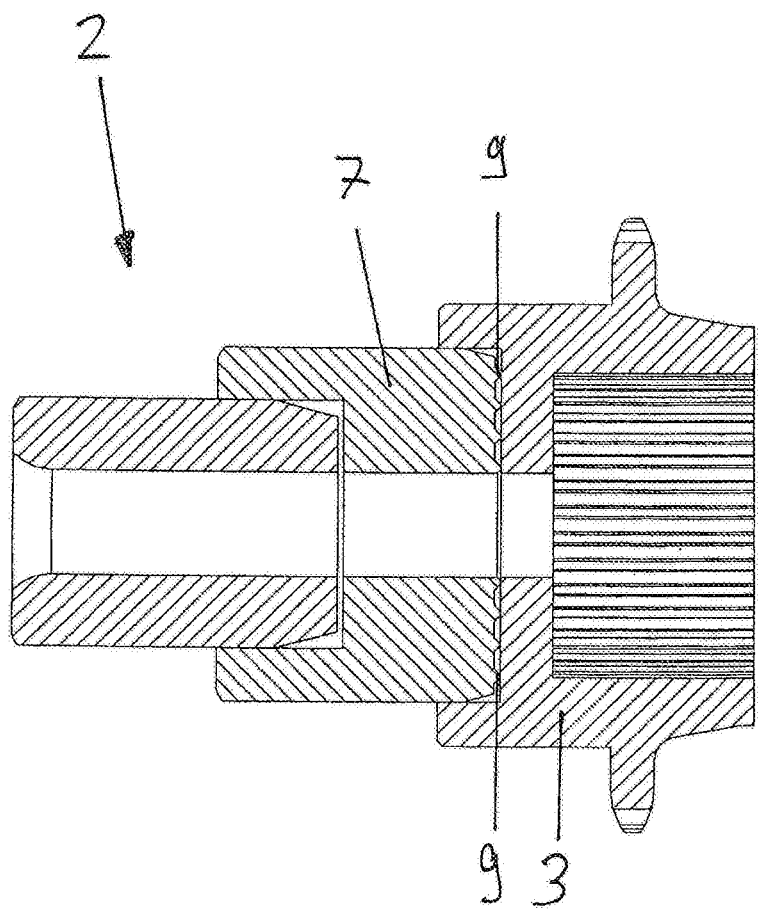
FIG. 8 shows a further exemplary configuration of a sintered part prior to joining using the example of a multipart chain wheel.

FIG. 8 shows a configuration of a sintered part 2 using the example of a multipart chain wheel. In particular, FIG. 8 shows a first sintered joining part 3 and a second sintered joining part 7. The sintered joining part 7 is assigned a joining face which has a second deformation element 9 configured as a coaxial line elevation.

Figure 9:
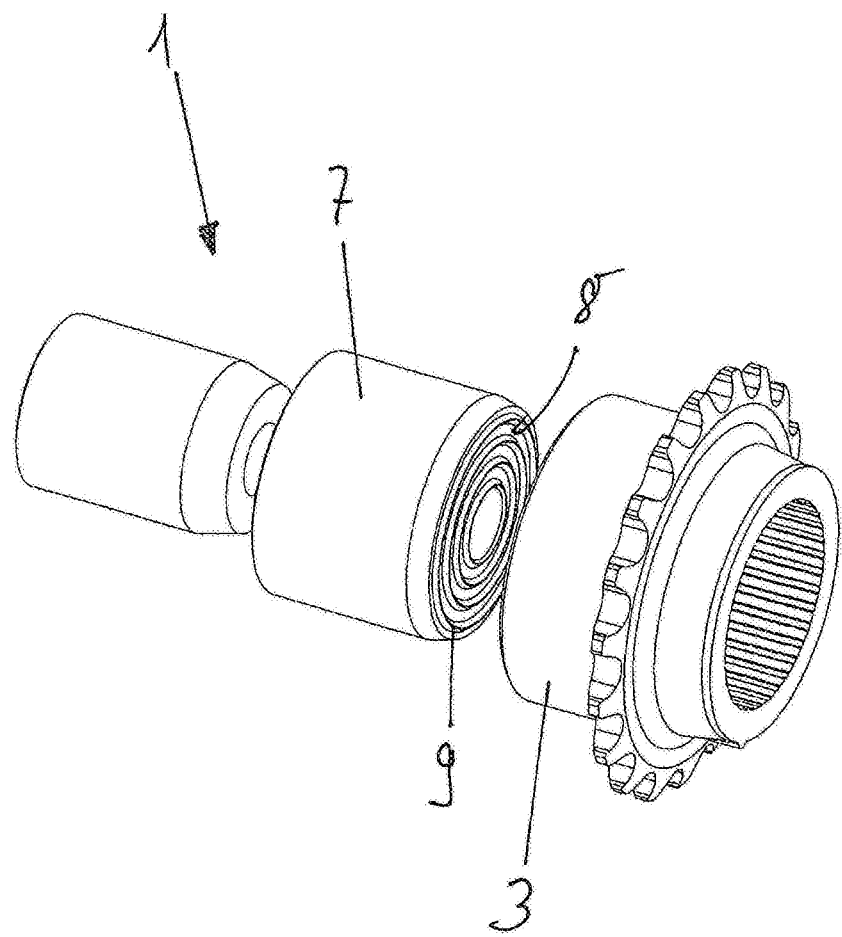
FIG. 9 shows an exploded illustration of the configuration of a sintered part shown in FIG. 8.

FIG. 9 shows an exploded illustration of the chain wheel in FIG. 8.

Figure 10:
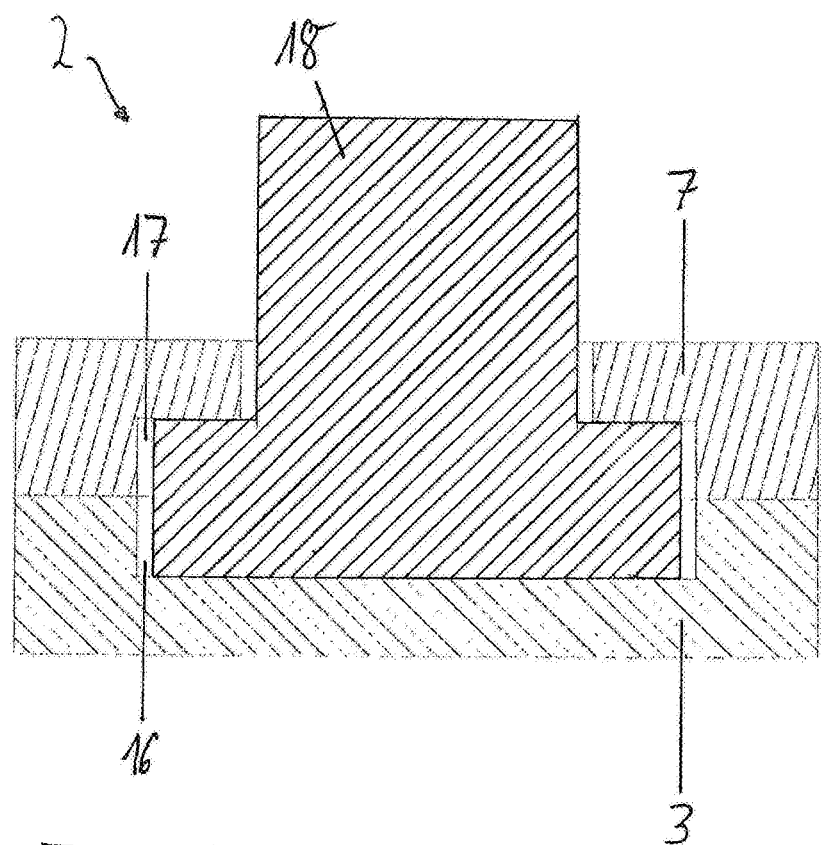
FIG. 10 shows a further exemplary configuration of a sintered part in section.

FIG. 10 shows a configuration of a sintered part 2. The sintered part 2 has a first sintered joining part 3 and a second sintered joining part 7, which are joined together. The sintered joining part 3 has a first cutout 16, which is configured as a depression in the first sintered joining part 3 and starts from the joining face of the sintered joining part 3. The sintered joining part 7 has a second cutout 17, which is configured as a continuous cutout, i.e. forms an opening in the second sintered joining part 7 in an axial direction. Within the space which is formed by the first cutout 16 and the second cutout 17, an insert part 18 is inserted, said insert part 18 projecting into an external region of the sintered part 2 through the opening in the second sintered joining part 7. Before the first sintered joining part 3 was joined to the second sintered joining part 7, the insert part had an axial extent which was at least partially greater than an overall axial extent within the first cutout and the second cutout. During joining, the insert part was compressed as a result in the axial direction and then, as a result, a precise-height molded part height was brought about.

Figure 11:
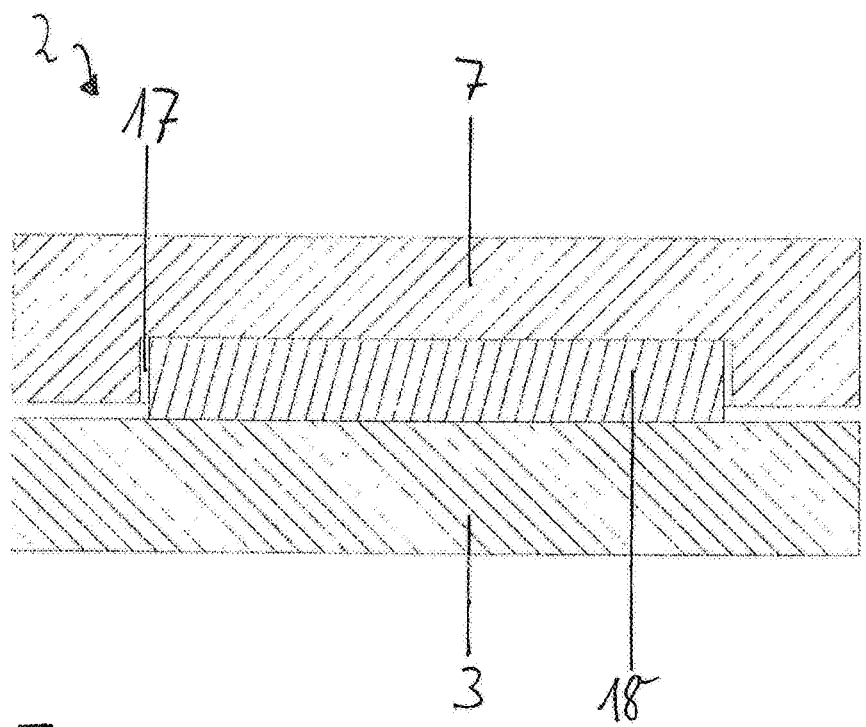
FIG. 11 shows a further exemplary configuration of a sintered part in section.

FIG. 11 shows a further configuration of a sintered part 2, which, in a similar manner to the configuration illustrated in FIG. 10, has an insert part 18 which has been inserted into a second cutout 17 in the second sintered part 7. In contrast to the exemplary embodiment in FIG. 10, the sintered part shown in FIG. 11 does not have a first cutout in the first sintered part 3. Likewise, the second cutout 17 is not configured as a continuous cutout, and so the insert part 18 is located in an interior of the sintered part 2 and does not pass into an external region.

The invention claimed is:

1. A method for producing a sintered part having a precise-height molded part height, wherein the sintered part is produced from a parts set comprising at least one first sintered joining part having at least one first joining face and a second sintered joining part having at least one second joining face, in which at least one of the first sintered joining part has at least one first deformation element arranged on the first joining face and the second sintered joining part has at least one second deformation element arranged on the second joining face, wherein the method comprises at least the following steps of:

joining the first sintered joining part to the second sintered joining part, wherein the first joining face is oriented toward the second joining face and further wherein, during joining, at least one of a first element arranged on the first joining face is introduced with a press fit into a first joining cutout formed in the second joining face and a second joining element arranged on the second joining face is introduced with a press fit into a second joining cutout formed in the first joining face;

pressing the first sintered joining part and the second sintered joining part together under an axial pressing force effected by a press tool, wherein the precise-height molded part height is established by the pressing-together operation in which at least one of the deformation elements is deformed;

removing the sintered part from the press tool as a sintered part with a precise-height molded part height;

wherein the first deformation element arranged on the first joining face is introduced into a first receiving hollow arranged on the second joining face and/or at least the second deformation element arranged on the second joining face is introduced into a second receiving hollow arranged on the first joining face, wherein at least one of the receiving hollows at least regionally has/have a smaller depth than the respectively corresponding deformation element height.

2. The method as claimed in claim 1, wherein
at least one of the first deformation element and the second deformation element at least sectionally borders a cavity formed by the first sintered joining part and the second sintered joining part during the pressing of the first sintered joining part against the second sintered joining part,
at least one deformation element is compressed by the deformation of the at least one of the first deformation element and of the second deformation element, and
the cavity is sealed off with respect to a fluid located in the cavity by the deformation of the deformation elements.

3. The method as claimed in claim 1, wherein at least one of
the first deformation element is arranged on the first joining element or the first joining element acts as the first deformation element and
the second deformation element is arranged on the second joining element or the second joining element acts as the second deformation element,
a region of the joining elements that is farthest away from the joining face is compressed in an end stage of the introduction of the joining elements.

4. The method as claimed in claim 1, wherein
at least the first joining element is configured in a narrowing manner with increasing distance from the first joining face, and at least the first joining cutout is configured in a narrowing manner with increasing depth into the second sintered joining part, and
the compressive deformation of the first joining element is brought about by the pressing-together operation.

5. The method as claimed in claim 1, wherein at least one insert part is inserted in at least one of the first cutout in the first sintered joining part and in the second cutout in the second sintered joining part, wherein the insert part is compressed in an axial direction during the pressing-together operation and as a result contributes to bringing about the precise-height molded part height.

6. The method as claimed in claim 1, wherein the production of the sintered part comprises bringing about high radial precision, wherein the bringing about of the high radial precision involves deformation of at least one radial deformation element.

7. A parts set of sintered joining parts for joining to form a sintered part having a precise-height molded part height, wherein the parts set comprises at least one first sintered joining part with at least one first joining face and a second sintered joining part with at least one second joining face;
wherein at least one of:
the first sintered joining part has at least one first deformation element arranged on the first joining face and
the second sintered joining part has at least one second deformation element arranged on the second joining face; and
wherein the precise-height molded part height is established by a pressing together operation in which at least one of the deformation elements is deformed;
wherein at least one of:
the first sintered joining part has at least one first joining element arranged on the first joining face and the second sintered joining part has a first joining cutout formed in the second joining face and
the second sintered joining part has at least one second joining element arranged on the second joining face and the first sintered joining part has a second joining cutout formed in the first joining face; and
wherein provision is made for the joining element to be introduced into the first joining cutout with a press fit;
wherein at least one of
the second sintered joining part has a first receiving hollow, arranged in the second joining face, for the first deformation element and
the first sintered joining part has a second receiving hollow, arranged in the first joining face, for the second deformation element,
wherein at least one receiving hollow at least regionally has a smaller depth than the respectively corresponding deformation element height.

8. The parts set as claimed in claim 7, wherein
the first deformation element is arranged on the first joining element and/or the second deformation element is arranged on the second joining element, or
the first joining element is configured as the first deformation element and/or the second joining element is configured as the second deformation element.

9. The parts set as claimed in claim 7, wherein at least one of the deformation elements is configured as an elevation with one of the geometrical shapes of spherical segment, truncated spherical segment, truncated cone, cuboid, truncated trapezium or truncated pyramid.

10. The parts set as claimed in claim 7, wherein at least one of the deformation elements
has a minimum extent of an upper contact face of 0.2 mm in at least one dimension of the contact face,
has an extension of a base of 0.4 mm to 2.0 mm in at least one dimension of the base and/or
has a height of 0.1 mm to 2.0 mm between the base and the contact face.

11. The parts set as claimed in claim 7, wherein the precise-height joined sintered part is a rotor for a camshaft adjuster, a pump ring, a stator or a shock absorber piston.

12. The use of a parts set as claimed in claim 7 for joining to form a sintered part that is removable from a press as a precise-height sintered part.

13. The parts set as claimed in claim 7, wherein the precise-height molded part height is a distance between a first outwardly-facing axial surface of the first sintered joining part and a second outwardly-facing axial surface of the second sintered joining part and wherein the first outwardly-facing axial surface faces opposite the first joining face on the first sintered joining part and the second outwardly-facing axial surface faces opposite the second joining face on the second sintered joining part.

14. The parts set as claimed in claim 7, wherein the deformation element is in a plastically deformed state; and
wherein the pressing-together operation results in a friction fit between at least one of the first or second joining elements and the respective one of the first or second joining cutouts thereby securing the first sintered joining part to the second sintered joining part.

15. A parts set of sintered joining parts for joining to form a sintered part having a precise-height molded part height, wherein the parts set comprises at least one first sintered joining part with at least one first joining face and a second sintered joining part with at least one second joining face;
wherein at least one of:
the first sintered joining part has at least one first deformation element arranged on the first joining face and
the second sintered joining part has at least one second deformation element arranged on the second joining face; and
wherein the precise-height molded part height is established by a pressing together operation in which at least one of the deformation elements is deformed;
wherein at least one of:
the first sintered joining part has at least one first joining element arranged on the first joining face and the second sintered joining part has a first joining cutout formed in the second joining face and
the second sintered joining part has at least one second joining element arranged on the second joining face and the first sintered joining part has a second joining cutout formed in the first joining face; and
wherein provision is made for the joining element to be introduced into the first joining cutout with a press fit;
wherein at least one of the sintered joining parts has a cavity for passing through a fluid, and in that at least one of the deformation elements at least sectionally borders the cavity in order to seal off a fluid located in the cavity after the joining of the sintered part and the compressive deformation that occurs of the deformation element at least sectionally borders the cavity.

16. A parts set of sintered joining parts for joining to form a sintered part having a precise-height molded part height, wherein the parts set comprises at least one first sintered joining part with at least one first joining face and a second sintered joining part with at least one second joining face;
wherein at least one of:
the first sintered joining part has at least one first deformation element arranged on the first joining face and
the second sintered joining part has at least one second deformation element arranged on the second joining face; and
wherein the precise-height molded part height is established by a pressing together operation in which at least one of the deformation elements is deformed;
wherein at least one of:
the first sintered joining part has at least one first joining element arranged on the first joining face and the second sintered joining part has a first joining cutout formed in the second joining face and
the second sintered joining part has at least one second joining element arranged on the second joining face and the first sintered joining part has a second joining cutout formed in the first joining face; and
wherein provision is made for the joining element to be introduced into the first joining cutout with a press fit;
wherein the parts set has at least one insert part for inserting into at least one of a first cutout in the first sintered joining part and a second cutout in the second sintered joining part, having an axial extent of the insert part which is at least partially greater than an overall axial extent of the first cutout and the second cutout.

* * * * *